United States Patent [19]
Lale

[11] 3,782,682
[45] Jan. 1, 1974

[54] FLUID FLOW CONTROLLER
[76] Inventor: Walter G. Lale, 10215 Cord Ave., Downey, Calif. 90241
[22] Filed: Nov. 1, 1971
[21] Appl. No.: 194,120

[52] U.S. Cl............... 251/61.1, 235/201, 251/367, 137/624.18
[51] Int. Cl. ......................................... F16r 31/165
[58] Field of Search...................... 137/85, 624.18; 251/61.1, 367; 235/201 ME

[56]         References Cited
         UNITED STATES PATENTS
3,648,716   3/1972   Joesting................................. 137/85
3,550,629   12/1970  Kreuter........................ 235/201 ME

*Primary Examiner*—Alan Cohan
*Attorney*—Rolf M. Pitts

[57] ABSTRACT

Fluid control apparatus for selective flow switching of a pressurized fluid source. A manifold chamber having a fluid inlet port, also has a fluid outlet port defined by an annular wall with mouth extending into the manifold chamber. A control chamber, adjacent to the manifold chamber, has a control pressure port adapted to be connected to a control pressure source. A differentially pressure responsive elastomeric diaphram member sealingly separates and constitutes a common wall of the manifold chamber and control chamber, and is adapted to seat against the mouth of the annular wall, as to prevent fluid flow through the apparatus to the outlet port from the inlet port. There may also be included apparatus for selectively connecting the control pressure port of the fluid control apparatus in fluid circuit with the outlet port thereof, whereby a differential seating pressure upon the diaphram member is removed.

2 Claims, 7 Drawing Figures

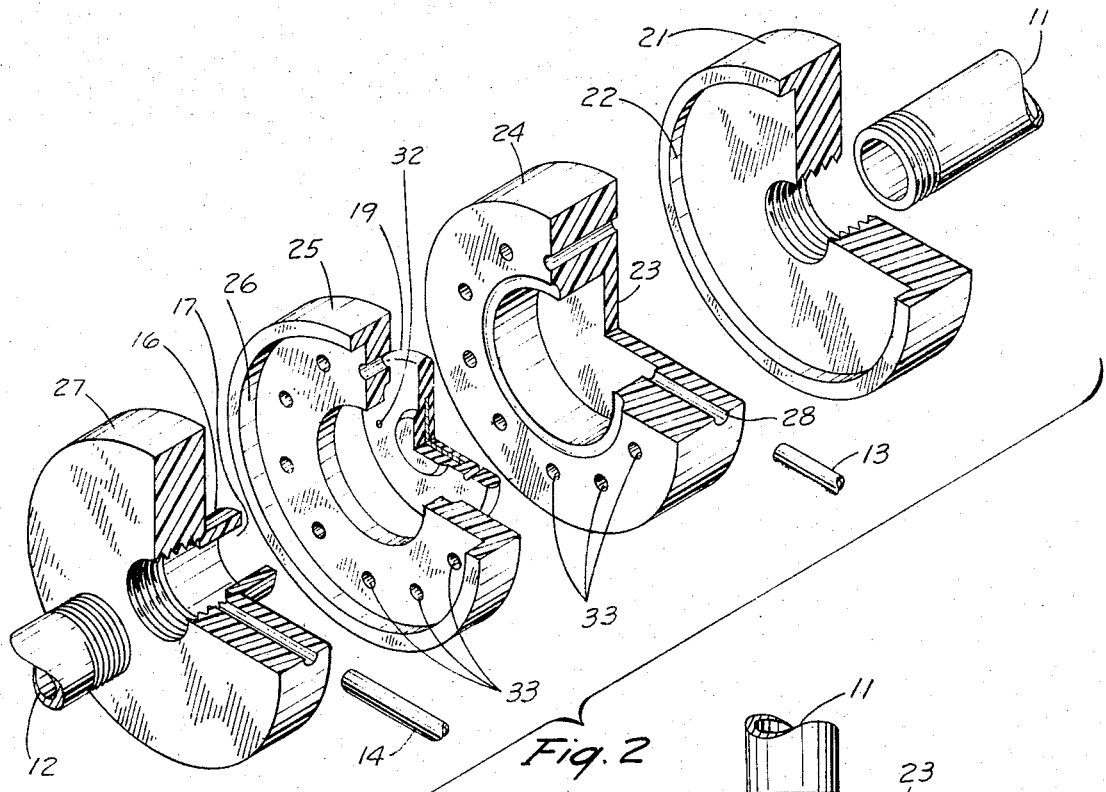
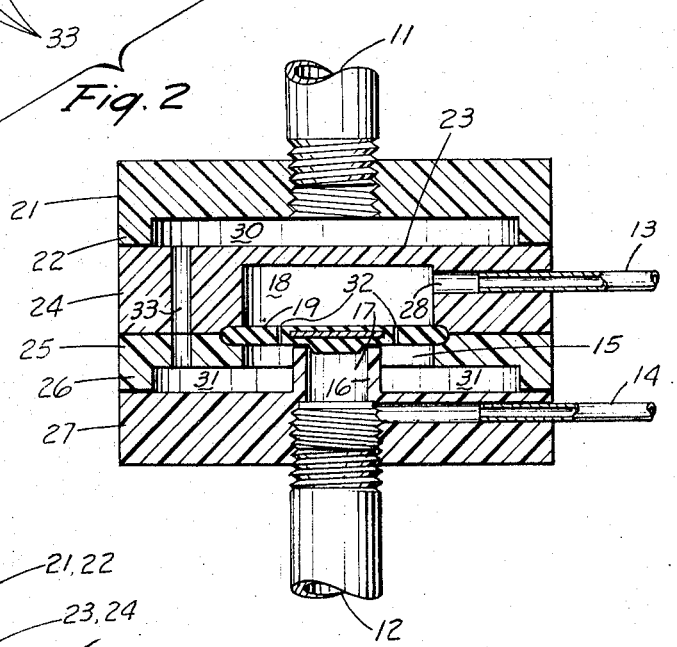
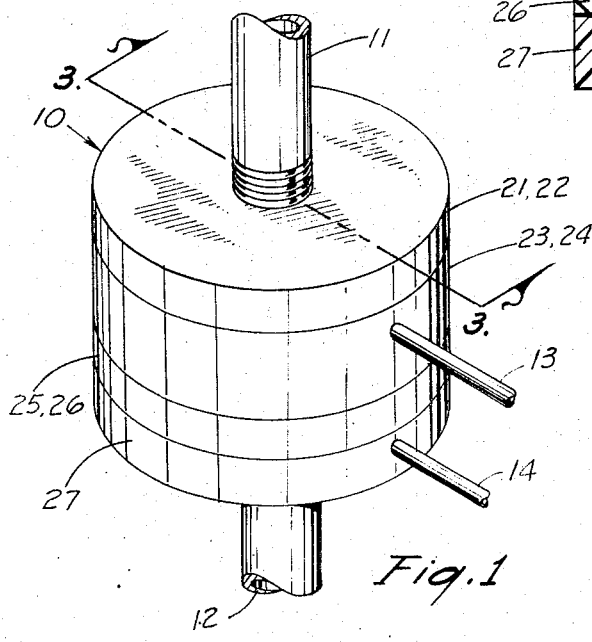
INVENTOR.
WALTER G. LALE

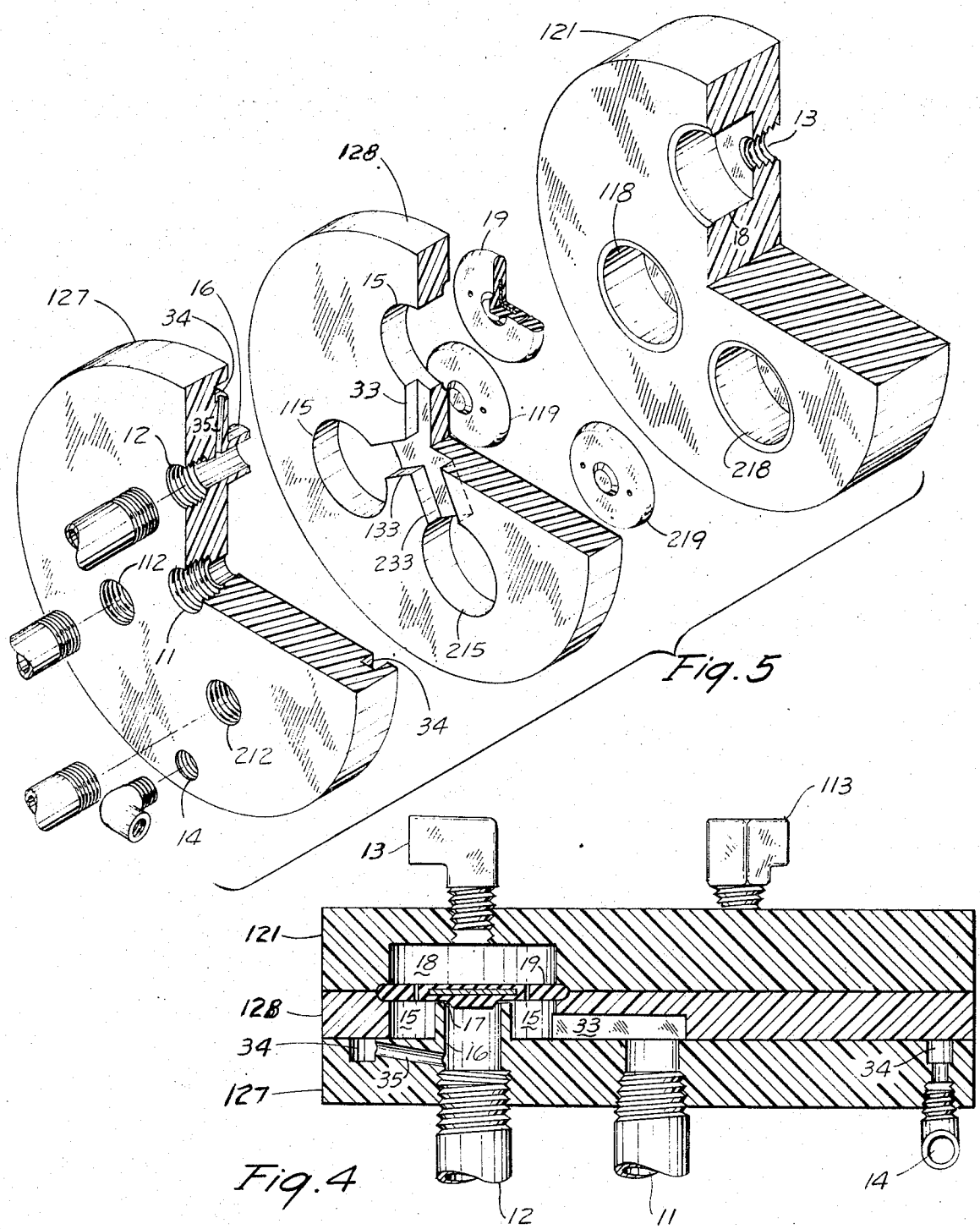

FLUID FLOW CONTROLLER

BACKGROUND OF THE INVENTION

The background art to which the subject invention most nearly relates is remotely operated valving means for turning-on or turning-off fluid flow such as a water sprinkler installation or the like, although the utility of the subject invention is not restricted to such application.

In the prior art of automatically controlled valves, various valve switching arrangements have been employed which are expensive to manufacture and sell. Such arrangements have included electromechanically operated valves or electromagnetically actuated valves which are expensive to construct and require electrical wiring to be provided to each of such valves. Such installations may also be dangerous to employ due to the hazardous combination of a conventional 110 volt source and the wet environment created by leaky valves and water run-off.

SUMMARY OF THE INVENTION

By means of the concept of the invention, the above-noted shortcomings of the prior art are avoided and there is provided control pressure-responsive fluid control apparatus for selective flow switching of a pressurized fluid source.

In a preferred embodiment of the invention there is provided a manifold chamber in fluid communication with a pressurized fluid inlet port and also having a fluid outlet port defined by an annular wall extending into the manifold chamber and having a mouth interior of the manifold chamber. A control chamber adjacent to the manifold chamber has a control pressure port adapted to be connected in fluid circuit with a control pressure source. There is also provided a differentially pressure-responsive diaphram sealingly separating and constituting a common wall of the manifold and control chambers, the diaphram being adapted to seat against the interior mouth of the annular wall.

In normal operation of the above-described arrangement, the diaphram is urged to seat against the interior mouth of the annular wall under a differential pressure condition of the control chamber relative to the manifold chamber. Such differential pressure condition may be induced by the application of a control pressure at the control pressure port by a master pressure control unit. Thus, in such first state, fluid flow between the pressurized fluid input and the output port is blocked. When the control pressure is removed from the control pressure port, the pressure state of the pressurized fluid applied to the manifold chamber, being substantially unresisted by a pressure state within the control chamber, forces the diaphram off the mouth, thus allowing fluid communication between such pressurized fluid input port and such outlet port.

Such switching fluid pressure may be remotely transmitted by a single pressure line, as to avoid the necessity of electromagnetically actuated valves and associated electrical wiring provisions therefor. Further because such electro-magnetic actuation of the valves is avoided, the expense of such actuation elements and the associated expense of insulating and water-proofing such elements from the water valves actuated thereby is avoided. Also avoided is the electrical hazard associated with operation of an integral assembly of electromagnetic actuator and water valve.

Accordingly, it is a broad object of the invention to provide improved flow control switching means.

Another object of the invention is to provide low-cost and non-hazardous flow-control switching means.

A further object is to provide control pressure-responsive flow control switching means.

These and other objects of the invention will become apparent from the following description, taken together with the accompanying drawings, in which:

BRIEF DESCRIPTION OF THE DRAWINGS

FIG. 1 is a perspective view of one aspect of the invention;

FIG. 2 is an exploded view of the device of FIG. 1;

FIG. 3 is a vertical central section of the device of FIG. 1;

FIG. 4 is a perspective view of another aspect of the slave control valve concept of FIGS. 1, 2 and 3;

FIG. 5 is an exploded view of the device of FIG. 4;

In the figures, like reference characters refer to like parts.

DESCRIPTION OF THE PREFERRED EMBODIMENTS

Figure 6:
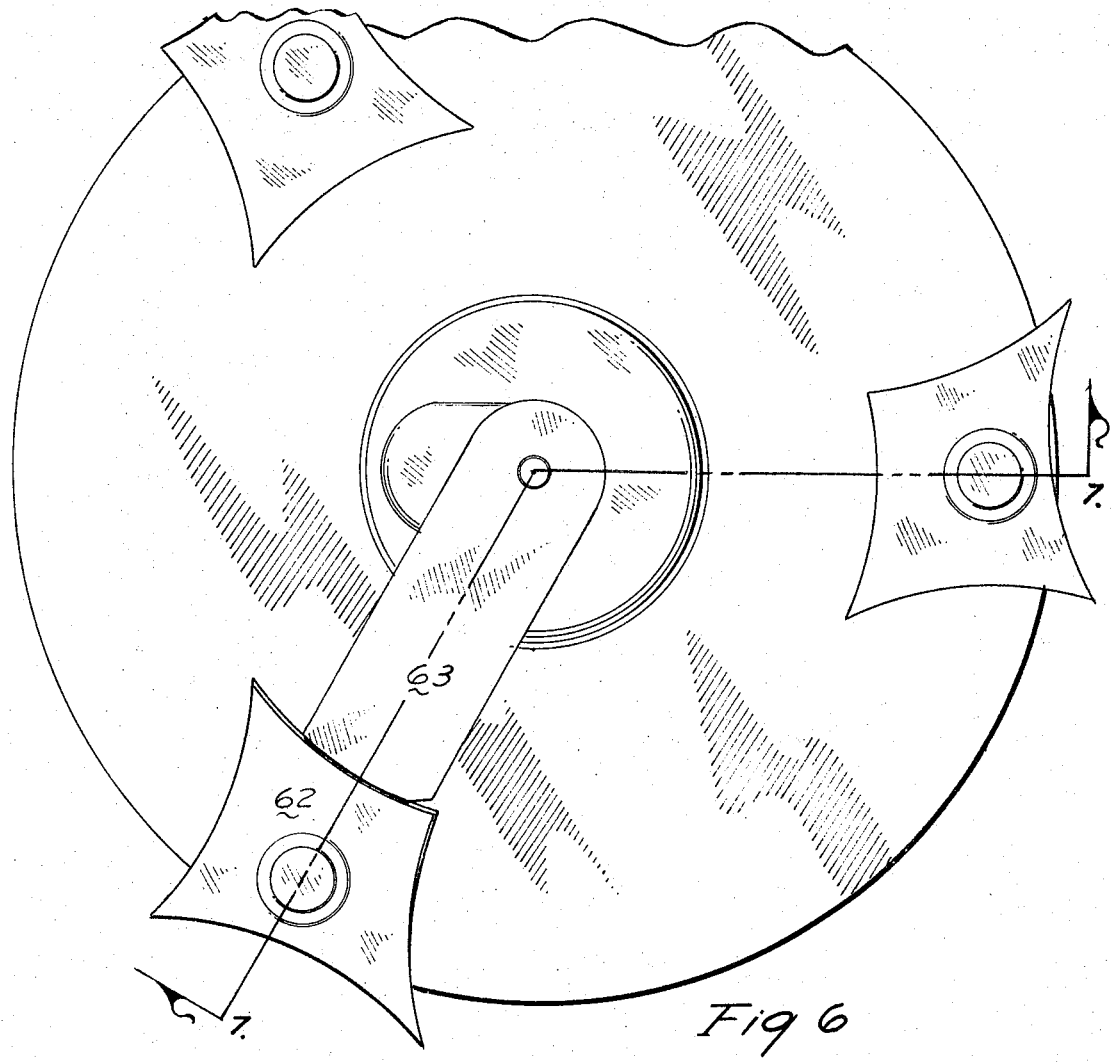
FIG. 6 is a plan view of a master control timer valve, which may be employed to control the device of FIGS. 4 and 5.

Referring now to FIG. 1, there is illustrated in perspective one aspect of the invention. There is provided a control pressure responsive fluid flow control switching device 10 having a pressurized fluid input port 11 and a fluid output port 12. Interposed in fluid circuit between ports 11 and 12 is a fluid flow switch operated in response to a fluid control pressure applied to a fluid control port 13 and shown more particularly in FIGS. 2 and 3. A control fluid return port 14 may also be provided, for allowing drainage of any control pressure fluid (from a master control unit) to output port 12.

In normal operation of the device of FIG. 1, input port 11 is connected to a source of pressurized fluid or water and output port 12 is connected to pressurized fluid utilization means such as a sprinkler line or the like, the flow of fluid between ports 11 and 12 being controlled or switched by application or removal of a fluid control pressure applied to control port 13.

The interior arrangement of the switching device of FIG. 1 is shown in fuller detail in the exploded view of FIG. 2 and the central vertical section of FIG. 3 as including a manifold chamber 15 in fluid communication with an input port 11 and also having a fluid outlet port 12 defined by an annular wall 16 extending into manifold chamber 15 and having a mouth 17 interior thereof. There is also provided a control chamber 18 adjacent manifold chamber 15 and having a control pressure port 13 adapted to be connected in fluid circuit with a controlled pressure source. A differentially pressure-responsive elastomeric diaphragm member 19 sealingly separates and constitutes a common wall of (between) manifold chamber 15 and control chamber 18. Diaphragm member 19 is arranged to seat against mouth 17 of annular wall 16 under a differentially pressurized condition of control chamber 18 relative to manifold chamber 15.

As shown more particularly in FIG. 3, the device of FIGS. 1 and 2 may be formed of seven axially stacked sections 21–27 of substantially like radial extent, adjacent sections thereof being sealingly bonded together. Such sections may be formed, cast or extruded from inexpensive plastic materials. A first and seventh section 21 and 27 thereof being pierced terminal sections, pierced sections 21 and 27 comprising a respective inlet port 11 and outlet port 12, pierced terminal section 27 further including annular wall 16. Second and sixth sections 22 and 26 interiorly axially adjacent first and seventh sections 21 and 27 respectively, are constructed as relatively thin annular rings as to form intermediate chambers 30 and 31, enclosed by third and fifth axial sections 23 and 25 interiorly axially adjacent the second and sixth sections 22 and 26 respectively.

Fourth and fifth axial sections 24 and 25 are axially adjacent third and sixth sections 23 and 26 respectively, as well as mutually adjacent, and are formed as thick annular rings having an inside radial extent larger than the outside radial extent of annular wall 16. A mutually adjacent end of the ring interiors of fourth and fifth sections 24 and 25 is chamfered to form an annular groove for restraining diaphram member 19. Fourth section 24 also encloses control chamber 18, fifth section 25 enclosing manifold chamber 15. It is also to be noted that fourth axial section 24 includes a radial passageway 28 in communication with and terminating at control chamber 18, which passageway 28 comprises pressure control port 13. The fluid circuit between input port 11 and manifold chamber 15 is connected by means of axial passageways or orifices 33 in third, fourth and fifth sections 23, 24 and 25 in mutual registry as to provide communication between intermediate chambers 30 and 31.

As seen more clearly in FIG. 2, in view of the rolled edge configuration of diaphram member 19, several pin-hole sized apertures 32 are provided for communicating the static pressure of manifold chamber 15 to the underside of that portion of diaphram member 19 sealing off control chamber 18. In this way, diaphram member 19 is continuously subjected to a differential pressure condition, representing the difference between the pressures of chambers 15 and 18, while the rolled edge or hollow vessel configuration of member 19 assures a good sealing fit when seated upon mouth 17 of annual wall 16.

By application of a fluid pressure to pressure control port 13, diaphram member 19 is caused to seat against mouth 17, thereby substantially blocking fluid flow to output port 12 from manifold chamber 15. Such control pressure need only be equal to the static pressure of the pressurized fluid input applied to input port 11. Upon removal of the control pressure from pressure control port 13, the fluid pressure of the fluid contained in manifold chamber 15 urges diaphram 19 up (in the illustrated arrangement of FIG. 3), thereby allowing pressurized fluid to flow from input port 11 through intermediate chamber 30, thence through axial-orifices 33 to second intermediate chamber 31, and via manifold chamber 15 past mouth 17 and exiting output port 12.

Although the device of FIGS. 1, 2 and 3 has been described in terms of seven axial sections, it is clear that the functions of several sections may be combined and that a lesser number of axial sections may be employed to construct the device, with further reductions in costs of fabrication.

Accordingly, a control pressure-responsive, fluid control switch has been described. Such device may be conveniently and inexpensively retrofied in any fluid system such as a sprinkler system in which a simple pressure-responsive control valve is desired. An automatic timer device for periodically applying and removing a control pressure may be made to cooperate with the device in automatic sprinkler systems for private lawns, freeway landscaping, golf courses, municipal parks, and the like. The device may be employed in many other pipeline control applications such as irrigation on farms, automatic stock watering in feedlot operations, automatic control of artesian wells, turning-on fire-fighting sprinkler systems.

Where the external portion of control port 13 may be a flexible tied-off piece of tubing, entrapping a limited amount of incompressible fluid, such as water, in control chamber 18, the device of FIGS. 1, 2 and 3 may be made to operate as a manually-controlled valve by merely squeezing or pinching such external tubing, as to reduce the internal volume thereof, thereby applying a control pressure to control chamber 18.

Where a periodically operated valve switching function is sought for a plurality of sequentially operated valves, an integral assembly of a plurality of such valves may be provided by means of an embodiment corresponding to the exemplary three-valve arrangement of FIGS. 4 and 5. FIG. 4 is an elevation of such three-valve arrangement by which three devices of the type of FIGS. 1, 2 and 3 are embodied, while FIG. 5 is an exploded view of the arrangement of FIG. 4, showing in further particularity the details of construction and arrangement of the device of FIG. 4.

Referring now to FIG. 4, there is illustrated an exemplary three-valve device, built-up from laminated or bonded axial sections of plastic material, the arrangement having a common input port 11; first, second and third output ports 12, 112 and 212; and first, second and third pressure control ports, 13, 113 and 213. There may also be provided return drain or bleed line ports 14 for exhausting any leakage or bled-off fluid in the control of the pressurized fluid applied to the control ports of the slave control valves by a master control unit such as a timer operated device or the like.

The exploded view of FIG. 5, of the multiple valve device in FIG. 4, corresponds to that of FIG. 2 for the single valve device, and illustrates three principal axial sections, a first terminal section 121, a central section 128, and a second terminal section 127. First terminal section 121 includes three equiangularly-spaced bores or like chambers 18, 118 and 218, each representing a control chamber for a separate one of the three control valves of the multiple valve integral assembly of FIGS. 4 and 5, and corresponding to control chamber 18 of FIG. 3. Each control chamber has a control pressure port, port 13 for chamber 18 being clearly visible in FIGS. 4 and 5 and corrsponding to port 13 in the single valve arrangement of FIG. 3.

Intermediate axial element 128, as shown in FIG. 5, includes three like bores or chambers 15, 115 and 215, similarly spaced as control chambers 18, 118 and 218 of first terminal element 121 and arranged in registry with respective chambers thereof. Chambers 15, 115 and 215 corresponding to manifold chamber 15 of FIG. 3. Element 128 further includes a radial array of mutually interconnecting channels or orifices 33, 133 and 233, the radial extremities of which channels intersect a respective one of manifold chambers 15, 115 and 215. Also provided in the arrangement of FIG. 5 are three elastomeric diaphram members 19, 119 and 219 for sealingly separating and constituting a common wall for a respective one of sets of adjacent chambers 15 and 18, 115 and 118, and 215 and 218, upon the inregistry axial bonding of axial sections 121 and 128. Elements 19, 119 and 219 in FIG. 5 correspond to element 19 of FIG. 3.

Second terminal axial section 127 in FIG. 5 includes three output ports 12, 112 and 212, each compassed by an annular wall 16 axially extending into a respective one of manifold chambers 15, 115 and 215. As shown in FIG. 4, the mouth 17 of annular wall 16 forms a seat for elastomeric diaphram member 19, corresponding to the like cooperation of such like referenced elements in FIG. 3. Axial element 127 also includes a single common pressurized fluid input port 11, axially extending and centrally located as to communicate with radially arrayed channels 33, 133 and 233 of axial element 128. Also included in the arrangement of FIGS. 4 and 5 is an annular groove 34 located in the interior face of second terminal axial element 127 and externally concentric of chambers 15, 115 and 215 and in communication with external port 14 and also connected to each of outlet ports 12, 112 and 212 by means of a respective orifice 35. Such arrangement corresponds to the illustrated cooperation of port 14 in FIG. 3 for discharging exhausted or leaked control fluids from a remotely located master control unit, used for application of control pressures to control pressure ports 13, 113 and 213 in FIGS. 4 and 5.

In normal operation of the device of FIGS. 4 and 5, a fluid control pressure applied to a pressure control port 13 seats diaphram 19 against mouth 17 of annular wall 16, as to prevent any fluid discharge therethrough to output port 12. Upon the removal of such control pressure from port 13, the pressure of a pressurized fluid source, applied to input port 11, is communicated through orifice 33 (in FIG. 4) to manifold chamber 15 and the underside of the annular periphery of diaphram 19, urging an upward deflection of diaphragm as to displace the seating thereof over the mouth 17 of annular ring 16. Such unseating of diaphram 19 allows the pressurized fluid in manifold chamber 15 to escape via annular member 16 to outlet port 12. The re-application of a control pressure to port 13 would again reseat diaphram 19 upon mouth 17, thereby cutting off fluid flow from input port 11 to output port 12.

The devices of FIGS. 1, 2, 3, 4 and 5 operate with a positive switching, or snap, action upon the occurence of the slightest force differential across diaphram 19, due to the differential areas upon which the fluid pressures act. For example, when in the switched-off or valve-off state of the valve, it is to be appreciated that while the control pressure applied at port 13 acts upon the entire upper surface of diaphram 19, the pressure of the pressurized fluid in manifold 15 is acting only upon that portion of the lower surface of diaphram 19 which is externally concentric of valve seat 17. Thus, like pressures in both manifold chamber 15 and control chamber 18 results in an affirmative differentially downward or seating force upon diaphram 19 in the quiescent valve-shut state.

However, where the control pressure in control chamber 18 is slightly relieved, to where the force exerted by such pressure upon the total upper diaphram area is less than that force exerted by the manifold pressure upon the annular partial underside area of diaphram 19, as to unseat and deflect diaphram 19 upward, the fluid escaping from manifold chamber 15 then communicates fluid pressure to the central area of diaphram 19 as to increase the total unseating force, thereby accelerating completion of the unseating action and affirmatively sustaining the valve-open state.

Figure 7:
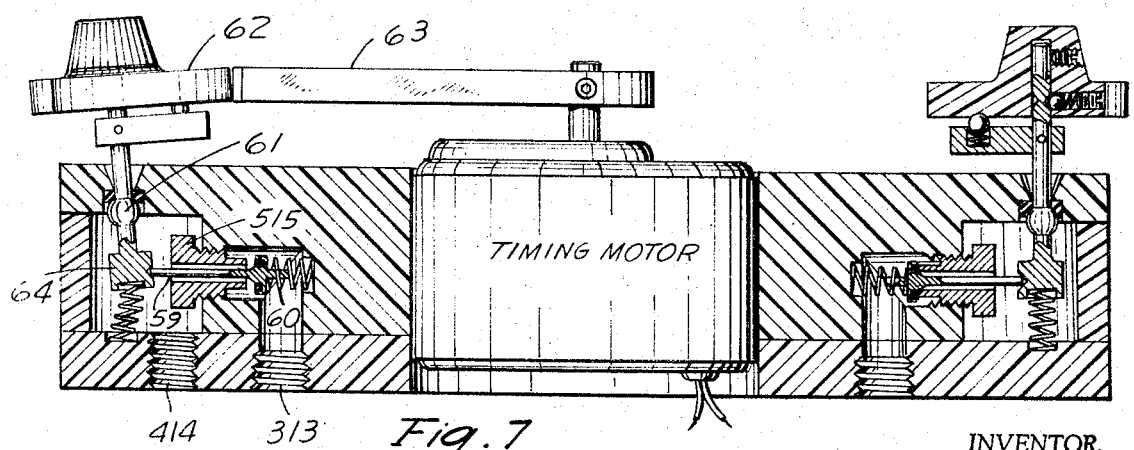
FIG. 7 is an elevation view in partial section of the device of FIG. 6.

The valves of the integral multiple valve assembly of FIGS. 4 and 5 or a plurality of valves of the configuration of FIGS. 1, 2 and 3 may be controlled as slave valves sequentially by a master clock-driven device for selectively applying a control pressure to the control pressure ports of selected one of such valves. Such timer may include an integral assembly of a plurality of valves similar to, say, the basic design of FIGS. 4 and 5 with certain modifications or additional design features and preferably employing the same pressurized fluid source therefor as a switching control pressure source. In such an arrangement, no valve seat and diaphram are employed, corresponding to elements 17 and 19. Instead, cam-switched orifices (or springloaded needle valves, for example) are employed. As shown in FIG. 7, the application of a pressurized source to a common input port (not shown in FIG. 7, but corresponding to port 11 in FIG. 5) is communicated by means well understood to each of a plurality of valve chambers 315, which may house a spring-loaded needle valve 60 or the like. Such needle valve controls the alternate application and bleeding of fluid pressure to a small line (via manifold chamber 513) to the control port 13 of an associated slave valve (in say FIG. 4). Valve stem 59 of needle valve 60 is operated by a sealed and spring-loaded mechanical toggle 64, pivoted about point 61 by the application of a horizontal (or tangential) force applied at shoulder 62 by a motor-driven rotating cam 63.

Shoulder 62 of the mechanical toggle 64 is detentably rotatably adjustable to discrete ones of alternative positions which present different angular extents to cam 63, whereby the duty cycle of a given valve may be selected, as may be more clearly appreciated from FIG. 6. Rotation of cam 63 sequentially operates each of successive ones of toggles 64 and an associated set of master and slave valves. Port 414 (in FIG. 7) may be employed to communicate leakage or bleed fluid to drain port 14 of the slave valve assemblies of FIGS. 1, 2, 3, 4 and 5.

Although the slave valve arrangement of FIGS. 4 and 5 has been described as useful in a switchable fluid transfer function, sequentially controlled by the timer-master valve arrangement of FIGS. 6 and 7, the concept of such device is not so limited. It is contemplated that such slave valve arrangement may be used as a controlled jet stream source, the jet provided by each valve unit being radially oriented as to be equi-angularly disposed in a common (say, horizontal) plane as to be useful in the maneuvering of a marine vessel or the like. Also, the master valve assembly for control of such slave valves need not be a time for providing only sequential operation of successive valves, but instead may comprise a manually-operated joy stick steering arrangement with suitably sized cam as to allow operation of a selected single one or pair of valves in such control function, whereby a jet stream of a selected one of a number of discrete directions may be obtained for as long an interval as desired.

Although a pinhole aperture has been illustrated in diaphram 19 to communicate fluid pressure to the control chamber 18 (as to allow the filling thereof after dumping or bleeding), such pinhole need not be located in diaphram 19, but alternatively may be located to communicate between an intermediate chamber of pressurized fluid and control chamber 18.

Where desirable, dynamic damping means may be incorporated into the design of diaphram element 19. Such damping means may be desired, for example, in installations in which the fluid source may be particularly subject to hydraulic pounding in responsive to valve operation or where the pressure control line or control orifice sufficiently restricts the escape of control fluid (in a valve open mode), whereby valve chatter may be induced. Such damping means may be comprised of an orifice centrally located in diaphram 19 and means for constraining a non elastic plunger within the control chamber above the diaphragm, the force of gravity tending to maintain the plunger seated against and blocking such central orifice. In this way, any tendency toward sharp hydraulic vibration will lift the inelastic plunger from its seated position, while the tendency of fluid flow through such orifice or the undulating motion of the diaphragm through the fluid medium in response to such hydraulic vibration, will not intercouple such hydraulic vibration and control pressure. In other words, chattering and destructive feedback of hydraulic vibration tends to be damped, if not avoided. Also, such structural modification thus allows longer control line lengths or remote distances to be operably utilized between the master and slave stations.

Accordingly, there has been described a highly useful, pressure-responsive valve that is economical to manufacture and safe to use.

Although the invention has been described and illustrated in detail, it is to be clearly understood that the same is by way of illustration and exmple only and is not to be taken by way of limitation, the spirit and scope of this invention being limited only by the terms of the appended claims.

I claim:

1. Monostable fluid control apparatus for selective flow switching of a pressurized fluid source, comprising
    an enclosed first chamber having a first radial extent and first and second enclosed axial ends,
    an exit port at said first axial end of said first chamber and formed of an annular wall extending axially into said first chamber and of a lesser second radial extent than said first radial extent,
    a control pressure port in fluid communication with said first chamber via said second axial end of said chamber,
    a single differential pressure-responsive elastomeric diaphram member having a third radial extent at least as co-extensive as the radial extent of said first chamber and axially restrained therein adjacent to the axial extent of said interiorly extending annular wall by means of annular groove within said first chamber as to sealingly divide said first chamber into a control chamber which includes said control pressure port, and a valve manifold which includes said exit port, a first face of said diaphram member adapted to sealingly seat upon a moutn of said annular wall,
    a pressurized fluid inlet port in fluid communication with said first face of said diaphram member,
    said communicating inlet port, said outlet port, and said differential pressure-responsive diaphram member cooperating in the manner of a fluid control valve, a shut-off mode thereof being induced in response to a fluid control pressure applied to said control pressure port;
    said monostable fluid control apparatus being formed of seven stacked axial sections of substantially like radial extent, adjacent sections thereof sealingly bonded together,
    a first and seventh section thereof forming a respective first and second pierced terminal section, said pierced first and second terminal sections comprising a respective pressurized fluid inlet port and outlet port, said second pierced terminal section including
        an axially extending annular wall having a mouth in communication with said outlet port,
    a second and sixth section interiorly axially adjacent to said first and seventh sections respectively and being relatively thin wall annular rings as to form first and second intermediate chambers respectively, said first chamber being completed and enclosed by a third section interiorly axially adjacent to said second section, said second chamber being enclosed by the body of said stacked axial sections in cooperation with said diaphram member
    a fourth and said fifth section axially adjacent to said third and sixth sections respectively and mutually adjacent and formed as thick annular rings having an inside radial extent larger than the outside radial extent of said annular wall, a mutually adjacent end of the ring interiors of said fourth and fifth sections being chamfered to form an annular groove for restraining said diaphram member, said fourth section enclosing said control chamber and said fifth section enclosing said valve manifold,
    said fourth axial section including a radial passageway extending into said control chamber and comprising said control pressure port.

2. Monostable fluid control apparatus for selective flow switching of a pressurized fluid source, comprising
    an enclosed first chamber having a first radial extent and first and second enclosed axial ends,
    an exit port at said first axial end of said first chamber and formed of an annular wall extending axially into said first chamber and of a lesser second radial extent than said first radial extent,
    a control pressure port in fluid communication with said first chamber via said second axial end of said chamber,
    a single differential pressure-responsive elastomeric diaphram member having a third radial extent at least as co-extensive as the radial extent of said first chamber and axially restrained therein adjacent to the axial extent of said interiorly extending annular wall by means of an annular groove within said first chamber as to sealingly divide said first chamber into a control chamber which includes said control pressure port, and a valve manifold which includes said exit port, a first face of said diaphram member adapted to sealingly seat upon a mouth of said annular wall,
    a pressurized fluid inlet port in fluid communication with said first face of said diaphram member,
    said communicating inlet port, said outlet port, and said differential pressure-responsive diaphram member cooperating in the manner of a fluid control valve, a shut-off mode thereof being induced in response to a fluid control pressure applied to said control pressure port;

said monostable fluid control apparatus being formed of seven stacked axial sections of substantially like radial extent, adjacent sections thereof sealingly bonded together, a first and seventh section thereof forming a respective first and second pierced terminal section, said pierced first and second terminal sections comprising a respective pressurized fluid inlet port and outlet port, said second pierced terminal section including an axially extending annular wall having a mouth in communication with said outlet port, a second and sixth section interiorly axially adjacent to said first and seventh sections respectively and being relatively thin wall annular rings as to form first and second intermediate chambers respectively, said first chamber being completed and enclosed by a third section interiorly axially adjacent to said second section, said second chamber being enclosed by the body of said stacked axial sections in cooperation with said diaphram member a fourth and said fifth section axially adjacent to said third and sixth sections respectively and mutually adjacent and formed as thick annular rings having an inside radial extent larger than the outside radiant extent of said annular wall, a mutually adjacent end of the ring interiors of said fourth and fifth sections being chamfered to form an annular groove for restraining said diaphram member, said fourth section enclosing said control chamber and said fifth section enclosing said valve manifold, said fourth axial section including a radial passageway extending into said control chamber and comprising said control pressure port, said third, fourth and fifth sections including orifices in mutual registry as to provide communication between said intermediate chambers.

* * * * *